United States Patent
Mellquist

[19]

[11] Patent Number: 6,115,545
[45] Date of Patent: Sep. 5, 2000

[54] AUTOMATIC INTERNET PROTOCOL (IP) ADDRESS ALLOCATION AND ASSIGNMENT

[75] Inventor: Peter E. Mellquist, Auburn, Calif.

[73] Assignee: Hewlett-Packard Company, Palo Alto, Calif.

[21] Appl. No.: 08/891,624

[22] Filed: Jul. 9, 1997

[51] Int. Cl.[7] .................................................. G06F 13/00
[52] U.S. Cl. ............................... 395/200.5; 395/200.51; 395/200.52; 395/200.53
[58] Field of Search ........................... 395/200.5, 200.51, 395/200.52, 200.53, 200.58, 200.59, 200.55, 200.56, 200.57

[56] References Cited

U.S. PATENT DOCUMENTS

| | | | |
|---|---|---|---|
| 5,557,748 | 9/1996 | Norris | 395/200.1 |
| 5,649,100 | 7/1997 | Ertel et al. | 395/200.1 |
| 5,724,510 | 3/1998 | Arndt et al. | 395/200.5 |
| 5,734,831 | 3/1998 | Sanders | 395/200.53 |
| 5,784,555 | 7/1998 | Stone | 395/200.5 |
| 5,819,042 | 10/1998 | Hansen | 395/200.52 |

OTHER PUBLICATIONS

Douglas E. Comer, [Internetworking with TCP/IP:Principles, Protocols, and Architecture], vol. 1, Chapters 9 and 21, 3rd Edition, 1995.

Primary Examiner—Parshotam S. Lall
Assistant Examiner—Philip B. Tran

[57] ABSTRACT

A network device connected to a local network is configured using a module operating within a console connected to the local network. Once activated, the module obtains an unused network address. After obtaining the unused network address, the console waits for receipt of a request from the network device. Upon receipt of the request, the console forwards to the network device a response. The response includes the unused address along with subnet and gateway information for the console. The console then establishes a network connection to the network device and displays on a monitor for the console, an address value, a subnet mask value and a gateway value for the network device.

18 Claims, 4 Drawing Sheets

AUTOMATIC INTERNET PROTOCOL (IP) ADDRESS ALLOCATION AND ASSIGNMENT

BACKGROUND

The present invention concerns interconnected network devices and pertains particularly to automated internet protocol (IP) address allocation and assignment for the internet protocol.

The Transport Control Protocol/Internet Protocol (TCP/IP) has entered the main stream as the protocol of choice for network connectivity. TCP/IP commonly referred to as IP, has a number of benefits which attract networks and users including standardization, rich protocol and application support and the ability to route over Wide Area Networks (WANs). Although IP has many benefits, IP is difficult to configure and administer. This is especially the case in environments where a network novice may be present. Errors which may occur during IP installation can cause severe network problems and can be difficult to solve. The steps required to setup and configure an IP host are not intuitive.

Table 1 below sets out the parameters which are required for IP operation.

TABLE 1

| Parameter | Where | Usage |
| --- | --- | --- |
| Internet Protocol Address | Local Host | Required for all IP communication. |
| Sub-Network Mask | Local Host | Required for sub-net determination. |

Table 2 below sets out optional configuration parameters for IP operation.

TABLE 2

| Parameter | Where | Usage |
| --- | --- | --- |
| Default Gateway | Local Host | Required only if multiple networks are present. |
| DNS Entry Definition | On DNS system | Required if friendly name usage is desired. |
| DNS Server Address | Local Host | Required on host for friendly name resolution. |
| WINS Server Address | On WINS system | Required for MS-Windows name resolution. |
| BOOTP Entry Definition | On BOOTP server | Required for automatic IP bootstrap. |
| DHCP Entry Definition | On DHCP server | Required for DHCP bootstrap. |

There are a variety of ways to configure and setup an IP protocol stack. IP is flexible in that the protocol stack may be configured manually on the host, or automatically. The current solutions can be broken down into two main areas, basic and optional configuration.

For basic IP configuration, an IP address is selected and configured on the host entity. Selection of an IP address requires that the user knows a unique address which corresponds to the network where the host entity is to operate. IP addresses are typically managed by one central authority in order to guarantee uniqueness. Also, an IP sub-net mask must be selected and configured on the host entity. Selection of the IP sub-net mask is required such that the host's protocol stack can determine when an address is meant for the local sub-net verses when it should be passed to the default gateway.

For optional IP configuration, a default gateway must be selected and configured on the host entity. In order to allow communication across multiple networks, the default gateway must be configured. Also, a matching friendly name must be selected and configured on the Domain Name Server (DNS).

If a friendly name is to be associated with the configured IP address, the name needs to be configured on a Domain Name Server.

Also, a DNS address must be selected and configured on the host entity.

In order for the IP entity to communicate with other IP entities using friendly names, a Domain Name Server address needs to be configured. A Windows Internet Name Service (WINS) server must be selected and configured on the host entity if MS-Windows networking is to be used. An IP host which is running the Microsoft (MS) Windows operating system, available from Microsoft Corporation, having a business address at 16011 NE 36th Way, Redmond, Wash. 98073-9717, may optionally define a WINS server. WINS is a name resolution service that resolves Windows networking computer names to IP addresses (not unlike DNS) in a routed environment. A WINS server handles name registration, queries and releases.

An alternate method of defining IP configuration information is through the usage of a BOOTstrap Protocol (BOOTP). BOOTP allows clients to automatically receive all IP configuration information from a configured BOOTP server. This frees the user from having to configure individual entities but the BOOTP server itself needs to be configured. The BOOTP server serves IP information as well as vendor specific data to an entity which has broadcast a BOOTP request.

Also, configuration may be through a Dynamic Host Configuration Protocol (DHCP) Server. DHCP provides a framework for passing configuration information to hosts on a TCP/IP network. DHCP is based on BOOTP, but goes beyond by adding the capability of automatic allocation of reusable addresses and configuration options. Like BOOTP, the configuration for individual entities must be configured on the DHCP server. DHCP reuses IP addresses but does not address the issue of friendly names associated with these addresses and how their associations may change.

The current IP configuration schemes are workable but are not intuitive. A TCP/IP knowledgeable person is required to provide the basic configuration information. A person familiar with TCP/IP but not familiar with the network cannot properly configure IP since the currently available set of addresses, a sub-net mask and default gateway are required. An improperly configured IP stack can cause serious problems to existing networks. For many entities which do not have a keyboard and monitor this task is even more difficult. For these kind of systems, the basic IP parameters need to be configured either out-of-band or using an automatic bootstrap protocol.

One of the difficulties of IP configuration is that there are many ways to do it. Given an entity with a IP stack it can be configured using a local console, using an Out-Of-Band console, using an in-band console, using BOOTP or using DHCP.

Specifically, a local console can be used to locally configure an entity provided the entity has a keyboard and monitor. For entities which do not have a keyboard and console but do provide a form of Out-Of-Band interface, such as RS-232, IP parameters can be configured via an Out-Of-Band console.

For entities which already have an IP stack and would like to perform changes, an In-Band session may be utilized to perform IP configuration via an In-Band Console. Typically, this is in the form of a Telnet session.

For automatic bootstrapping, BOOTP may be utilized. Here the work required is on the BOOTP server which needs to have an entry for the machine booting. For Ethernet entities, the MAC address must be entered along with the matching BOOTP data. DHCP is similar to BOOTP only IP addresses are reused and conserved by DHCP.

In order to configure the IP stack, some basic information is required in order to do it safely. In order to define an IP address, a free address in the range of valid addresses must be selected. Addresses are usually administered by a person who allocates these addresses to entities who require them. It is important that duplicate addresses are not allowed since this can cause major trouble. Also, a sub-net mask is required for proper operation. The mask must be the same on all entities across the sub-net. In addition, if the network has more than one sub-net and a gateway exists, it must be configured such the host can take advantage of it. In order to do so, the IP address of the gateway must be configured. If automatic bootstrapping is to be utilized, the host must be configured to issue a BOOTP or DHCP request (many IP stacks may do this automatically if no local stack is configured). Configuring the BOOTP or DHCP server can be a significant amount of work.

SUMMARY OF THE INVENTION

In accordance with the preferred embodiment of the present invention, a network device connected to a local network is configured using a module operating within a console connected to the local network. Once activated, the module obtains an unused network address. This is done, for example, by the console sending a ping request via the local network and receiving a ping response via the local network. Addresses which do not respond may be deemed as "not currently used". Alternatively, unused network addresses may be obtained through other mechanisms such as: DHCP or BOOTP table reading, Simple Network Management Protocol (SNMP), Management Information Base (MIB) variable reading, and simple administrator input.

After obtaining the unused network address, the console waits for receipt of a request from the network device. Upon receipt of the request, the console forwards to the network device a response. The response includes the unused address along with subnet and gateway information for the console. For example, the request is a BOOTP request and the response is a BOOTP response. The network device is initially configured using the unused address and the subnet and gateway information within the response.

The console then establishes a network connection to the network device and displays on a monitor for the console, an address value, a subnet mask value and a gateway value for the network device. For example, this is done by launching a world wide web browser directed toward the newly issued address. The address value, the subnet mask value and the gateway value are displayed in a web page of the web browser. In the preferred embodiment, the module is a plug-in module of the world wide web browser.

Also in the preferred embodiment, the user via the console, is provided opportunity to accept, deny or modify the address value, the subnet mask value and the gateway value for the network device. This is done, for example, via the web page displayed by the world wide web browser.

The present invention facilitates simplified configuration of a network device in a TCP/IP environment. This is especially beneficial to novice network users. For example, using the present invention, a user no longer has to enter data via an RS-232 port or utilize a BOOTP/DHCP server device to get a network device up and running. A user, however, still has the flexibility to change an initially assigned address. Also the present invention is adapted to be compatible with the existing BOOTP mechanism and so can be used on a wide variety of devices. In addition the preferred embodiment of the present invention is adapted for use as a plug-in to world wide web browsers. Thus the present invention provides assistant for any novice in configuration of an IP entity.

DESCRIPTION OF THE PREFERRED EMBODIMENT

Figure 1:
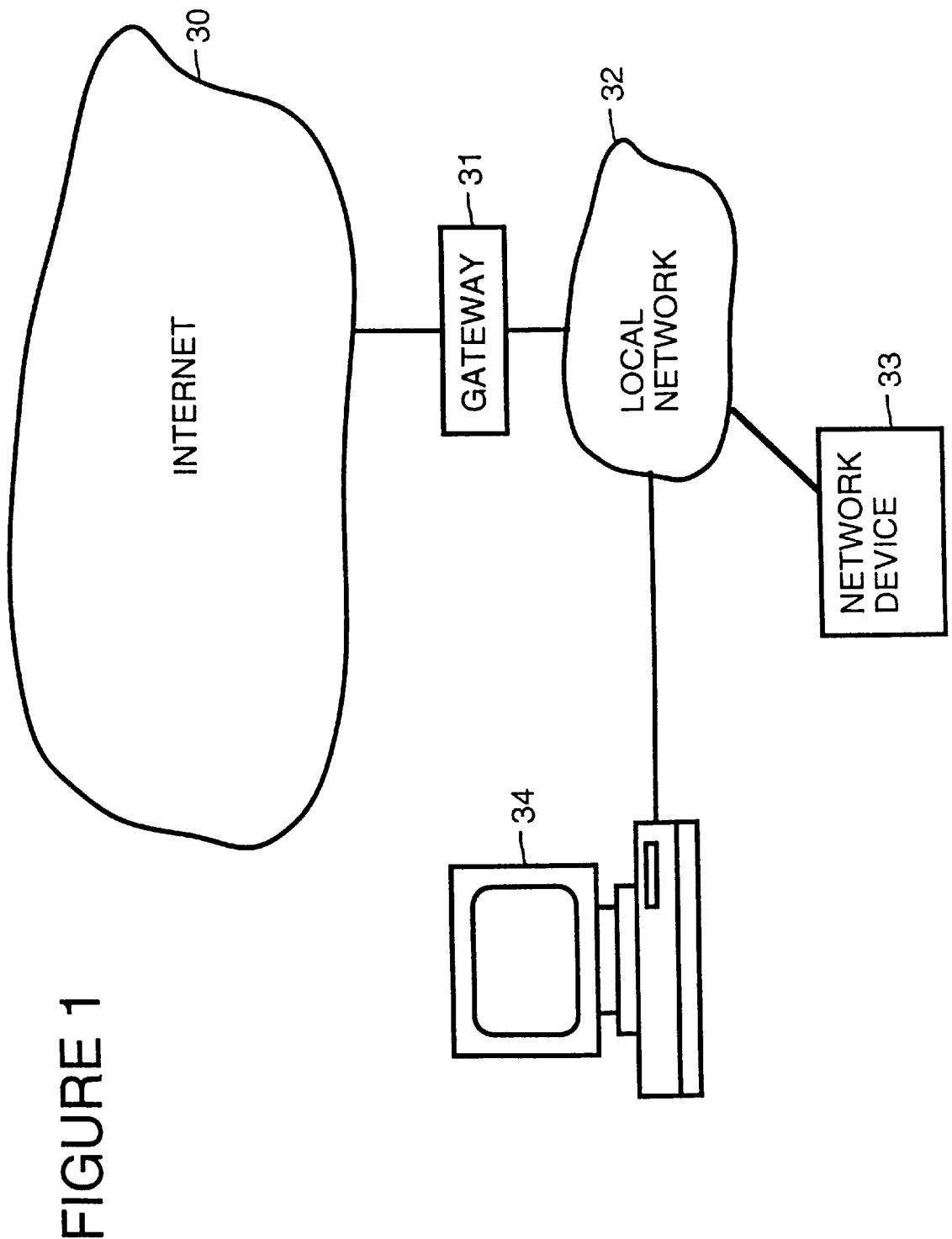
FIG. 1 is a simplified block diagram of a connected networks.

FIG. 1 is a simplified block diagram of a local network 32. Local network 32 is, for example, one or a combination of local area networks. A local console 34 and a network device 33 are shown connected to, and may be considered a part of local network 32. Local network 32 is, for example, connected to internet 30 through a gateway 31. Local console 34 is, for example, a personal computer.

Figure 2:
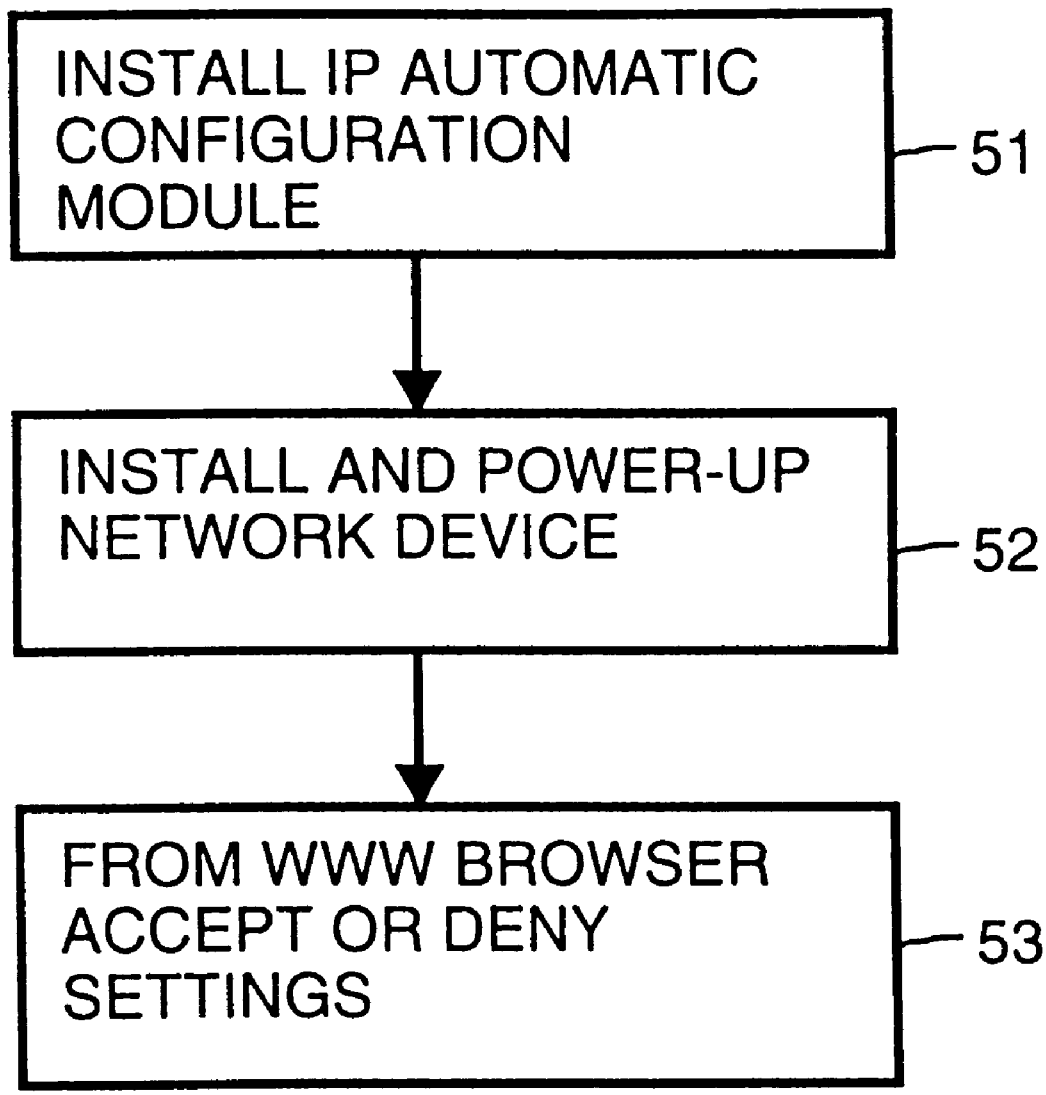
FIG. 2 is a simplified flowchart which illustrates IP configuration of a network device in accordance with a preferred embodiment of the present invention.

FIG. 2 illustrates a method for performing IP configuration of network device 33 in accordance with a preferred embodiment of the present invention. Data flow for the method is illustrated by FIG. 3.

In a step 51, shown in FIG. 2, an IP configuration module plug-in is installed into a World Wide Web (WWW) browser running within local console 34. For example, the WWW browser is a Netscape Navigator web browser available from Netscape Communications Corporation, or a Microsoft Internet Explorer web browser available from Microsoft Corporation, having a business address at 16011 NE 36th Way, Redmond, Wash. 98073-9717. Plug-ins are a standardized extension mechanism for WWW browsers. Plug-ins are typically used for decoding new media types but can be used for other purposes as well such as application integration with a WWW browser.

Figure 3:
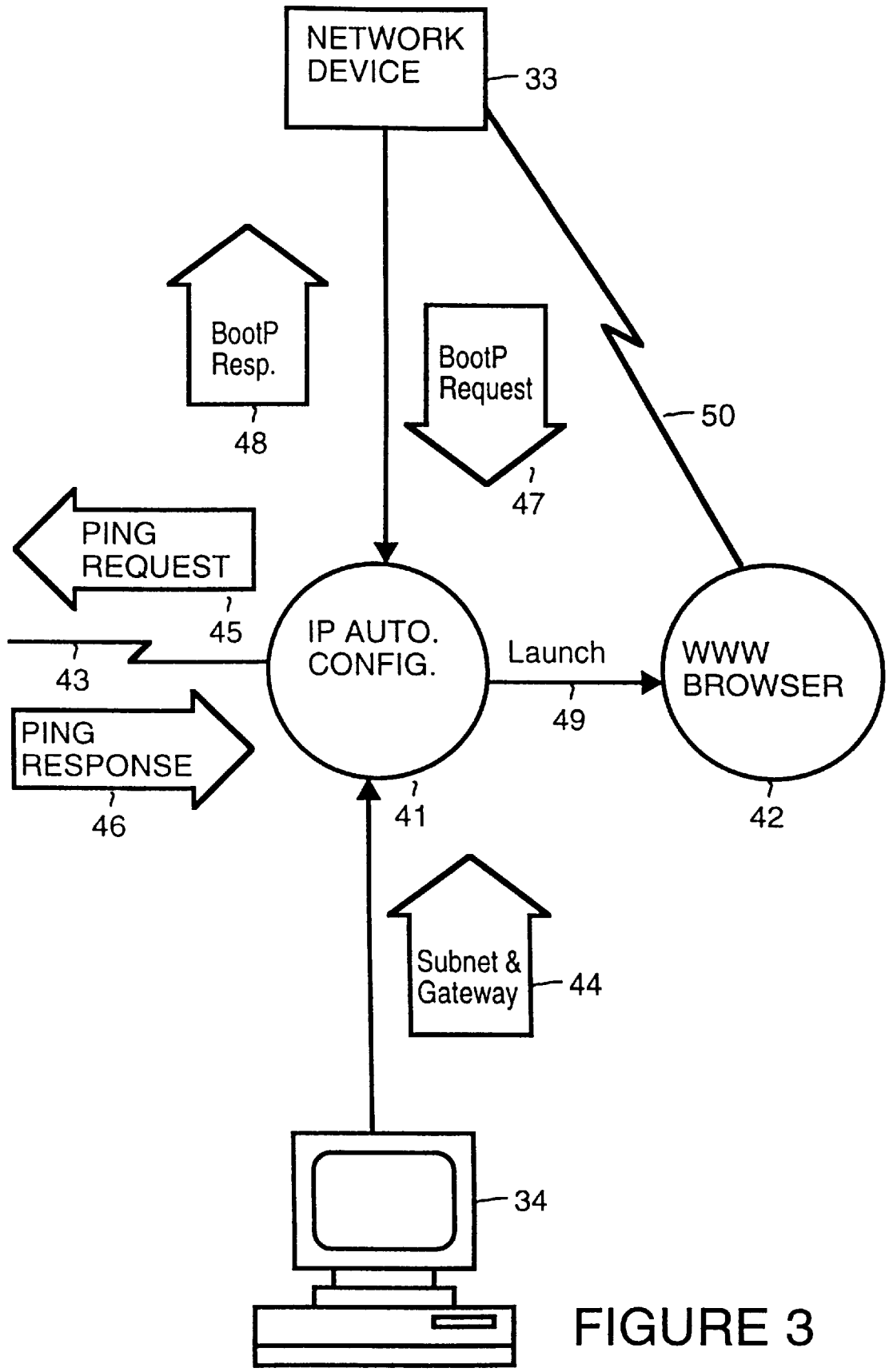
FIG. 3 is a data flow diagram which illustrates IP configuration of a network device in accordance with a preferred embodiment of the present invention.

For example, FIG. 3 shows an IP configuration module 41 which functions as a plug-in within a WWW browser 42. Local console 34 can initially receive IP configuration module 41 from a floppy disk, a CD ROM, over internet 30 or from another entity on local network 32. Once activated, for example by a user of local console 34 or via a local Uniform Resource Locator (URL), IP configuration module operates in accordance with the algorithm set out in Table 3 below:

TABLE 3

Find a free IP address using Random ICMP ping, discovery,
   DNS, ARP or RARP
Open BOOTP Server Port
On BOOTP Request DO
   if BOOTP Request is from recognized MAC address range
THEN
     Issue BOOTP response using free IP address, local sub-
       net mask and local gateway
     Invoke browser using free address in URL Once activated, IP configuration module 41 will find an address which is not in use. This is determined through a variety of techniques. For example, the address may be obtained using an Internet Control Message Protocol (ICMP) Ping. An ICMP Ping is a simple protocol used to determine connectivity and usage of an IP address. In addition, ICMP Ping may be used to determine round trip response times in a network protocol stack.

In addition, a Domain Name Server (DNS) address can be obtained. That is, using a DNS configuration table, addresses currently in use, or those about to be used can be determined. Also, addresses which will not be used can be determined and thereby be utilized as free addresses. Also an ARP cache reading can be performed.

For example, in FIG. 3, data flow for obtaining the address is illustrated by a ping request 45 and a ping response 46 make over datapath 43 to local network 32. Ping responses denote addresses being used.

In addition, IP configuration module 41 utilizes the sub-net mask and default gateway of local console 34 for configuring network device 33. This is illustrated by sub-net mask and gateway information 44 shown being transferred from local console 34 to IP configuration module 41.

Then IP configuration module 41 acts in place of a BOOTP server to accept and reply to a select set of BOOTP requests from devices having a recognized Media Access Control (MAC) address range. MAC addresses are used for level 2 addressing in the OSI 7 level model. A BOOTP request may contain a level 2 MAC address for an entity which requires a level 3 address. For example, using Ethernet protocol, a BOOTP request would contain an Ethernet MAC address. The corresponding BOOTP response would contain an issued IP address to that MAC address.

Once a valid BOOTP request has been received, IP configuration module 41 will issue a BOOTP response which includes the address which it has found to not be in use. The BOOTP response uses the sub-net mask and default gateway of local console 34. This is illustrated by BOOTP request 47 and BOOTP response 48 shown in FIG. 3 being transferred between network device 33 and IP configuration module 41.

Once BOOTP response 48 has been issued, IP configuration module 41 will invoke WWW browser 42 to point to the device address just issued. The Uniform Resource Location (URL) for network device 33 will include the newly issued address. The Uniform Resource Indicator (URI) will specify a configuration content page 20, shown in FIG. 4. Once network device 33 has accepted the address, the web server within network device 33 will accept requests from IP configuration module 41 and allow configuration content page 20 to be displayed within WWW browser 42.

In a step 52, shown in FIG. 2, network device 33 is installed in local network 32 and powered up. Once powered up, network device 33 will issue a broadcast BOOTP request (i.e., BOOTP request 47) which will be picked up by IP configuration module 41, as described above. IP configuration module 41 will issue BOOTP response 48 by which network device 33 will obtain the IP configuration parameters and proceed to initialize. WWW browser 42 is then launched, as illustrated by arrow 49. When launched, WWW browser 42 is pointed at network device 33. A Web Server running on network device 33 will respond to WWW browser 42 providing configuration information which WWW browser 42 displays on configuration content page 20 along with a web browser control panel 10.

In a step 53, shown in FIG. 2, configuration content page 20 is used to accept or deny the settings. That is, once network device 33 has been powered up, the operator can return to local console 34. Local console 34 will display configuration content page 20 with the configuration parameters for network device 33. This network connection is illustrated by network connection 50, shown in FIG. 3.

Figure 4:
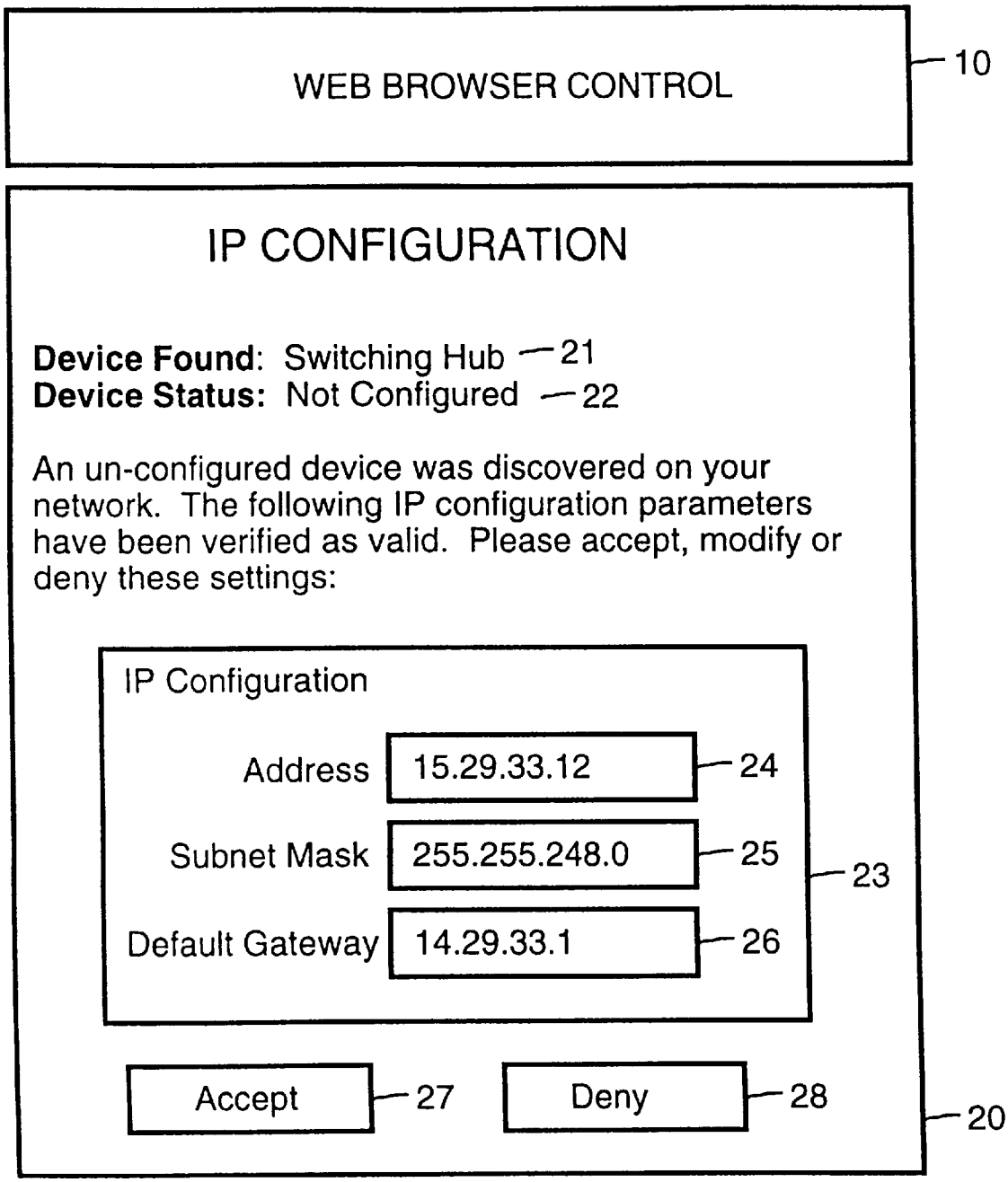
FIG. 4 shows a configuration Hyper Text Transfer Protocol (HTTP) "home page" used during IP configuration of a network device in accordance with a preferred embodiment of the present invention.

For example, as shown in FIG. 4, configuration content page 20, in a location 21, lists the type of device which is found. For example, configuration content page is a world wide web page. In a location 22, configuration content page 20 lists the status of the device found. In a location 24, within an IP configuration box 23, configuration content page 20 lists an IP configuration address assigned to network device 33 by BOOTP response 48. In a location 24, configuration content page 20 lists a subnet mask assigned to network device 33. In a location 26, configuration content page 20 lists a default gateway for network device 33.

A user may modify the IP configuration address in location 24, the subnet mask in location 25 and/or the default gateway in location 26. The user can deny the configuration by selecting a deny button 28. The user can accept the original or the modified configuration by selecting an accept button 27.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computer implemented method used in configuration of a network device connected to a local network comprising the following steps performed by a module operating within a console connected to the local network:

(a) in response to activation of the module, obtaining an unused network address;

(b) upon receipt by the console of a request from the network device, forwarding to the network device a response which includes the unused address obtained in step (a) along with subnet and gateway information for the console;

(c) establishing a network connection to the network device; and, (d) displaying on a monitor for the console, an address value, a subnet mask value and a gateway value for the network device.

2. A computer implemented method as in claim 1 wherein step (a) comprises the following substeps:

(a.1) sending a ping request via the local network; and, (a.2) receiving a ping response via the local network.

3. A computer implemented method as in claim 1 wherein in step (b) the request is a BOOTP request and the response is a BOOTP response.

4. A computer implemented method as in claim 1 additionally comprising the following step:
 (e) providing opportunity for a user via the console to accept, deny or modify the address value, the subnet mask value and the gateway value for the network device.

5. A computer implemented method as in claim 1 wherein step (d) includes launching a world wide web browser by which the address value, the subnet mask value and the gateway value are displayed.

6. A computer implemented method as in claim 5 wherein the module is a plug-in module of the world wide web browser.

7. A method for configuring a network device connected to a local network comprising the following steps:
 (a) from a console located within the local network, interrogating active network devices to determine an unused network address;
 (b) upon the console receiving a request from the network device, forwarding, by the console to the network device, a response which includes the unused address determined in step (a) along with subnet and gateway information for the console; and,
 (c) configuring of the network device using the unused address and the subnet and gateway information within the response forwarded in step (b).

8. A method as in claim 7 wherein step (a) comprises the following substeps:
 (a.1) sending a ping request from the console out to the local network; and,
 (a.2) receiving a ping response by the console from the local network.

9. A method as in claim 7 wherein in step (b) the request is a BOOTP request and the response is a BOOTP response.

10. A method as in claim 7 additionally comprising the following steps:
 (d) establishing a network connection between the console and the network device; and,
 (e) displaying on a monitor for the console, an address value, a subnet mask value and a gateway value for the network device.

11. A method as in claim 10 additionally comprising the following step:
 (f) providing opportunity for a user via the console to accept, deny or modify the address value, the subnet mask value and the gateway value for the network device.

12. A method as in claim 10 wherein in step (e) the address value, the subnet mask value and the gateway value are displayed within a window of a world wide web net browser.

13. Storage media which stores a software module, the software module, when run on a console connected to a local network, performing a method used in configuration of a network device connected to the local network, the method comprising the following steps:
 (a) in response to activation of the software module, obtaining an unused network address;
 (b) upon receipt by the console of a request from the local network, forwarding to the local network, a response which includes the unused address found in step (a) along with subnet and gateway information for the console;
 (c) establishing a network connection between the console and the network device; and,
 (d) displaying on a monitor for the console, an address value, a subnet mask value and a gateway value for the network device.

14. Storage media as in claim 13 wherein step (a) comprises the following substeps:
 (a.1) sending a ping request via the local network; and,
 (a.2) receiving a ping response via the local network.

15. Storage media as in claim 13 wherein in step (b) the request is a BOOTP request and the response is a BOOTP response.

16. Storage media as in claim 13 wherein the method additionally comprises the following step:
 (e) providing opportunity for a user via the console to accept, deny or modify the address value, the subnet mask value and the gateway value for the network device.

17. Storage media as in claim 13 wherein step (d) includes launching a world wide web browser by which the address value, the subnet mask value and the gateway value are displayed.

18. Storage media as in claim 17 wherein the software module is a plug-in module of the world wide web browser.

* * * * *